United States Patent
Dai et al.

(10) Patent No.: US 11,727,937 B2
(45) Date of Patent: Aug. 15, 2023

(54) CHANNEL-AGNOSTIC CONVERSATION INTELLIGENCE SERVICE

(71) Applicant: salesforce.com, inc., San Francisco, CA (US)

(72) Inventors: Wenqing Dai, Richmond, CA (US); Peng-Wen Chen, Foster City, CA (US); Priyank Saxena, Danville, CA (US)

(73) Assignee: Salesforce, Inc., San Francisco, CA (US)

( * ) Notice: Subject to any disclaimer, the term of this patent is extended or adjusted under 35 U.S.C. 154(b) by 227 days.

(21) Appl. No.: 17/342,465

(22) Filed: Jun. 8, 2021

(65) Prior Publication Data
US 2022/0392451 A1    Dec. 8, 2022

(51) Int. Cl.
*G10L 15/30*    (2013.01)
*G10L 15/22*    (2006.01)
*G10L 15/16*    (2006.01)
*G10L 15/32*    (2013.01)

(52) U.S. Cl.
CPC ............... *G10L 15/30* (2013.01); *G10L 15/16* (2013.01); *G10L 15/22* (2013.01); *G10L 15/32* (2013.01)

(58) Field of Classification Search
CPC .................. G10L 15/30; G10L 15/22
See application file for complete search history.

(56) References Cited

U.S. PATENT DOCUMENTS 5,392,223 A * 2/1995 Caci ................ H04N 7/147
   700/15
2020/0267224 A1* 8/2020 Doane ................ H04W 4/14

OTHER PUBLICATIONS

Google Cloud, "Contact Center AI," Date Unknown, ten pages, [Online] [Retrieved on Sep. 13, 2021] Retrieved from the Internet <URL: https://cloud.google.com/solutions/contact-center>.
Hso, "How to Configure Text Analysis in Microsoft Dynamics 365 for Sales & Service (CRM) with Azure Machine Learning Text Analytics," Apr. 12, 2018, 12 pages, [Online] [Retrieved on Sep. 13, 2021] Retrieved from the Internet <URL: https://us.hso.com/blog/how-to-configure-text-analysis-in-microsoft-dynamics-365-for-sales-service-crm-with-azure-machine-learning-text-analysis/>.

(Continued)

*Primary Examiner* — Ibrahim Siddo
(74) *Attorney, Agent, or Firm* — Fenwick & West LLP

(57) ABSTRACT

An online system, for example, a multi-tenant system interacts with various conversation channels, for example, various telephony services and artificial intelligence provider systems that perform artificial intelligence based analysis of conversations. The analysis of the conversation determines additional information describing the conversation, for example, sentiment of an utterance of the conversation, entities mentioned in an utterance of the conversation, intent of an utterance of the conversation, and so on. The online system stores the information describing conversations using a normalized representation that conforms to a unified conversation schema. Various applications may use the result of the analysis obtained from the AI provider systems to take further action, for example, recommend a specific workflow to an agent that is a participant in the conversation.

20 Claims, 7 Drawing Sheets

(56) References Cited

OTHER PUBLICATIONS

Microsoft, "Analyze real-time customer sentiment," Mar. 8, 2021, six pages, [Online] [Retrieved on Sep. 13, 2021] Retrieved from the Internet <URL: https://docs.microsoft.com/en-us/dynamics365/customer-service/enable-sentiment-analysis>.

World Wide Technology, "What is Google CCAI?," Dec. 11, 2020, six pages, [Online] [Retrieved on Sep. 13, 2021] Retrieved from the Internet <URL: https://www.wwt.com/article/what-is-google-ccai/>.

* cited by examiner

CHANNEL-AGNOSTIC CONVERSATION INTELLIGENCE SERVICE

BACKGROUND

Field of Art

This disclosure relates in general to conversations in an online system, and in particular to using artificial intelligence techniques such as machine learning based models for analyzing online conversations obtained from various channels.

Description of the Related Art

Online systems often interact with users using channels that allow users to interact with the online system in a natural way, for example, using voice and natural language. For example, a user may be able to ask the online system to perform certain tasks via the channel. A large online system, for example, a multi-tenant system may use multiple channels for interacting with users, for example, telephony services, messaging services, and so on. Artificial intelligence techniques are used for analyzing conversations performed with a user via the channel. Examples of artificial intelligence techniques used include machine learning based models, for example, artificial neural networks. These techniques help analyze the conversation to determine what action to take. The online system may assist an virtual agent, for example, by guiding a workflow for a representative based on the results of analysis of a conversation.

The artificial intelligence techniques used for analyzing conversations are constantly evolving. For example, new machine learning models may be developed that provide new or better analysis. A channel needs to invoke the artificial intelligence techniques to be able to utilize the analysis performed using the artificial intelligence technique. If new artificial intelligence techniques are developed or existing artificial intelligence techniques modified, the channel needs to be modified to utilize the new or modified artificial intelligence technique. Invoking an artificial intelligence technique by a channel requires significant development effort and expertise. Continuously keeping up with developments in artificial intelligence techniques using conventional techniques is an expensive and tedious process.

Figure 1:
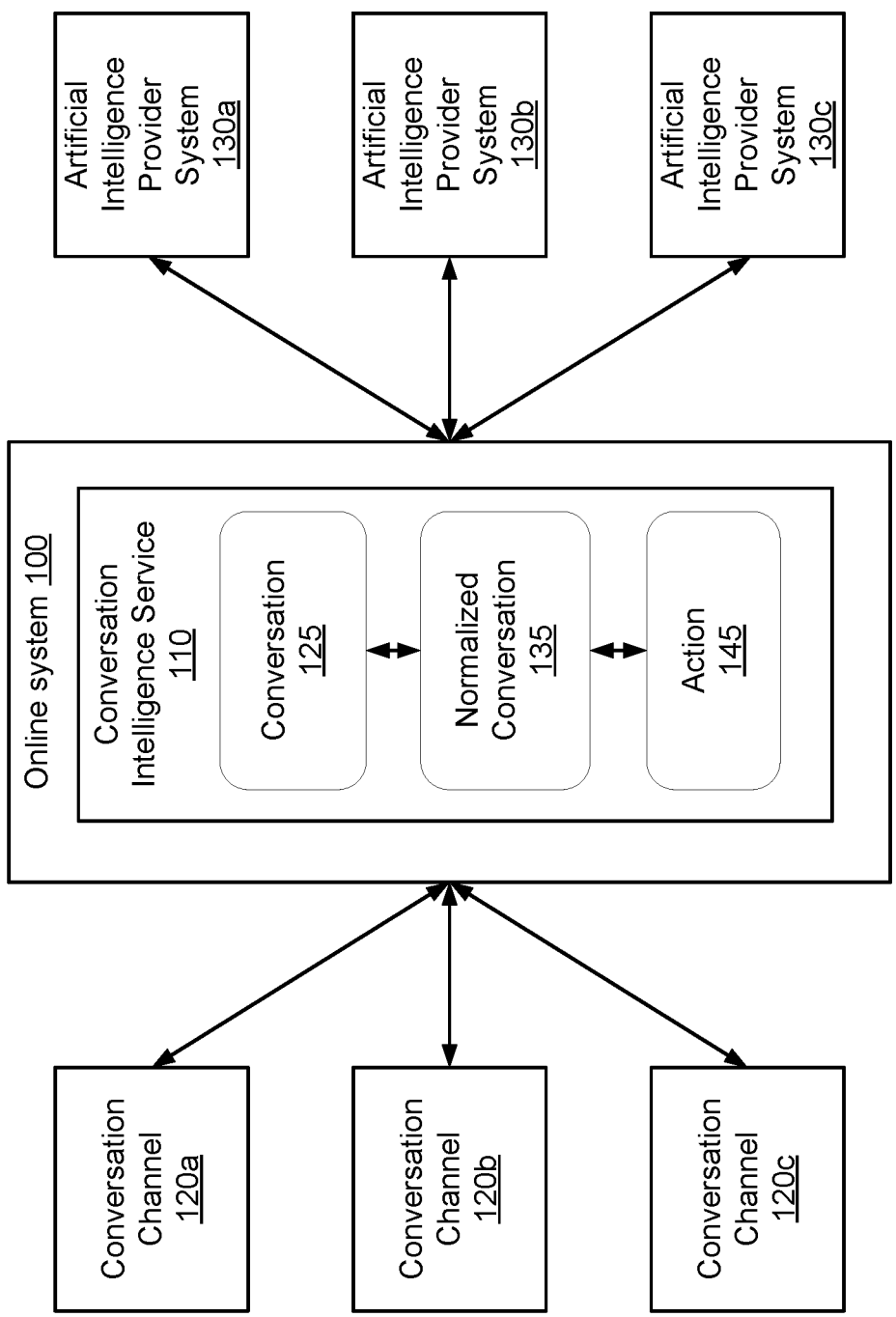
FIG. 1 is a block diagram of a system environment for using a conversation intelligence service for interfacing between conversation channels and artificial intelligence service providers, according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

An online system allows users to perform online conversations using various conversation channels and performs analyses of the conversations using various artificial intelligence (AI) techniques offered by various AI provider systems. A conversation channel may also be referred to herein as a communication channel or a channel. The online system includes a conversation intelligence service that interacts with (1) various conversation channels, for example, various telephony services and (2) AI provider systems that perform artificial intelligence based analysis of conversations. The conversation intelligence service listens to various conversations and may receive information describing the conversations, for example, utterances by the participants of the conversation as a stream or as transcriptions. The conversation intelligence service converts information describing the conversations to a normalized representation that conforms to a unified conversation schema. The conversation intelligence service interacts with one or more AI provider systems to analyze the conversations using AI techniques. The analysis of the conversation may determine additional information describing the conversation, for example, sentiment of an utterance of the conversation, entities mentioned in an utterance of the conversation, intent of an utterance of the conversation, and so on. The conversation intelligence service receives the results of analysis from the AI provider systems and may convert the results to a normalized representation that conforms to the unified conversation schema. Various applications may use the normalized representations of the AI analysis of conversations. The conversation intelligence service may store the AI analysis result as metadata describing the conversation. The online system may use the result of the analysis obtained from the AI provider systems to take further action, for example, recommend a specific workflow to an agent that is a participant in the conversation.

In an embodiment, the online system is a multi-tenant system that hosts data and services for multiple tenants. Each tenant of the multi-tenant system may represent an enterprise that performs a specific set of tasks for users. Each tenant may use a different conversation channel and AI provide systems. Each tenant may further configure the analysis differently.

The use of the conversation intelligence service allows the online system or tenants of a multi-tenant system to use various conversation channels and be able to exploit analysis performed using various AI provider systems seamlessly without having to modify their code every time a new AI provider system is available or if an existing AI provider system is upgraded to use new AI techniques or upgrade existing AI techniques.

System Environment

FIG. 1 is a block diagram of a system environment for using a conversation intelligence service for interfacing between conversation channels and artificial intelligence service providers, according to an embodiment. The system environment includes an online system 100 that interacts with one or more conversation channels 120a, 120b, 120c and with artificial intelligence service provider systems 130a, 130b, 130c. Although artificial intelligence service provider systems 130 are shown as separate systems, an artificial intelligence service provider system may be a part of the online system 100. For example, an artificial intelligence service provider system may be implemented using one or more software modules of the online system 100. The online system 100 includes a conversation intelligence service 110. The online system 100 may include other components not shown in FIG. 1, for example, data stores, external system interfaces, and so on. The system environment may include other elements not shown in FIG. 1, for example, a network. The online system 100 may be referred to herein as a system.

A conversation channel 120 allows users to perform conversations. Examples of conversation channels 120 include telephony services, messaging services, and so on. Different conversation channels may represent different service providers, for example, a conversation channel 120 may allow users to perform conversations using audio signals, text signals, video signals that include audio signals, images that include text messages, and so on.

A conversation is performed between two participants but may include more than two participants, for example, two users or a user and an automatic bot service. A conversation comprises a sequence of utterances. If a conversation is between two participants P1 and P2, typically, an utterance is provided by participant P1, followed by an utterance from participant P2, again followed by an utterance from participant P1, and so on. Accordingly, the conversation may comprise utterances received from the two participants alternately. A participant of a conversation may be an agent that is either a human or a computing system, for example, a chatbot that automatically prepares a response and sends to a user that is the other participant. A transcript of the conversation is received by the conversation intelligence service 110. The conversation intelligence service 110 may receive utterances as a stream of audio signals or as transcribed text. The conversation intelligence service 110 may process an utterance before the next utterance is received by the conversation channel 120.

The conversation intelligence service 110 receives information describing a conversation 125 and generates a normalized representation of the conversation 135. The normalized representation conforms to a unified conversation schema. The unified conversation schema may be based on a standard representation of nested objects, for example, JSON (JavaScript Object Notation) representation, XML (Extensible Markup Language) representation, YAML representation, or other representations. Accordingly, conversations that may be received in different formats from different conversation channels are all converted to the same normalized representation. Conversion to a normalized format allows the conversation intelligence service 110 to interact with an artificial intelligence provider system 130 using an API (application programming interface) of the artificial intelligence provider system 130. Furthermore, AI analysis results received from AI provider systems are also converted to the normalized representation. Using normalized representation for AI analysis results allows various applications to use the information for example, to determine what action to take based on the AI analysis.

The conversation intelligence service 110 provides an utterance or a set of utterances to an artificial intelligence provider system 130 via an API. The artificial intelligence provider system 130 performs analysis of the utterance or a set of utterances received from the conversation intelligence service 110 using an artificial intelligence technique. The artificial intelligence provider system 130 provides the result of the analysis to the conversation intelligence service 110. The result of the analysis is also converted to the normalized representation that conforms to the unified conversation schema. The conversation intelligence service 110 or the online system 100 may perform an action 145 based on the result of analysis of the conversation received from the artificial intelligence provider system 130. An example of the action is to recommend the next best action that can be performed at a particular stage in the conversation. The online system 100 provides the next best action recommendation to an agent, for example, a representative. The representative takes an action and provides a response to the user that is a participant in the conversation.

The conversation intelligence service 110 allows interfacing across conversation channels and between AI provider systems 130. Accordingly, users can use a particular conversation channel for performing conversations and the online system analyzes the conversations using one or more AI provider systems 130. Furthermore, if an AI provider system 130 is modified or upgraded to use a new AI techniques, the conversation intelligence service 110 is able to interact with the upgraded AI provider system 130, so long as the AI provider system 130 processes requests and provides results using the normalized conversation format.

The availability of various types of AI analysis in a normalized format allows various application developers to develop applications using the additional conversation data available as results of the AI analysis. Accordingly, the developers can build applications based on the type of AI analysis available according to the unified conversation schema and the conversation intelligence service 110 connects with the appropriate AI provider system that performs the corresponding AI analysis to determine the used AI analysis results.

The online system 100 shown in FIG. 1 represents a computing device. A computing device can be a conventional computer system executing, for example, a Microsoft™ Windows™-compatible operating system (OS), Apple™ OS X, and/or a Linux OS. The various system shown in FIG. 1 may interact with each other via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

In some embodiments, the online system 100 is a multi-tenant system that stores data of multiple tenants. Each tenant may be an enterprise. For example, a tenant may be a company that employs sales people that use the multi-tenant system to manage their sales processes. A multi-tenant system may store data for multiple tenants in the same physical database but enforce a logical separation of data across tenants. As a result, one tenant does not have access to another tenant's data, unless such data is expressly shared.

In an embodiment, a multi-tenant system implements a web-based customer relationship management (CRM) system. For example, the multi-tenant system may include application servers configured to implement and execute CRM software applications as well as provide related data, code, forms, webpages and other information to and from client devices and to store to, and retrieve from, a database system related data, objects, and webpage content.

System Architecture

Figure 2:
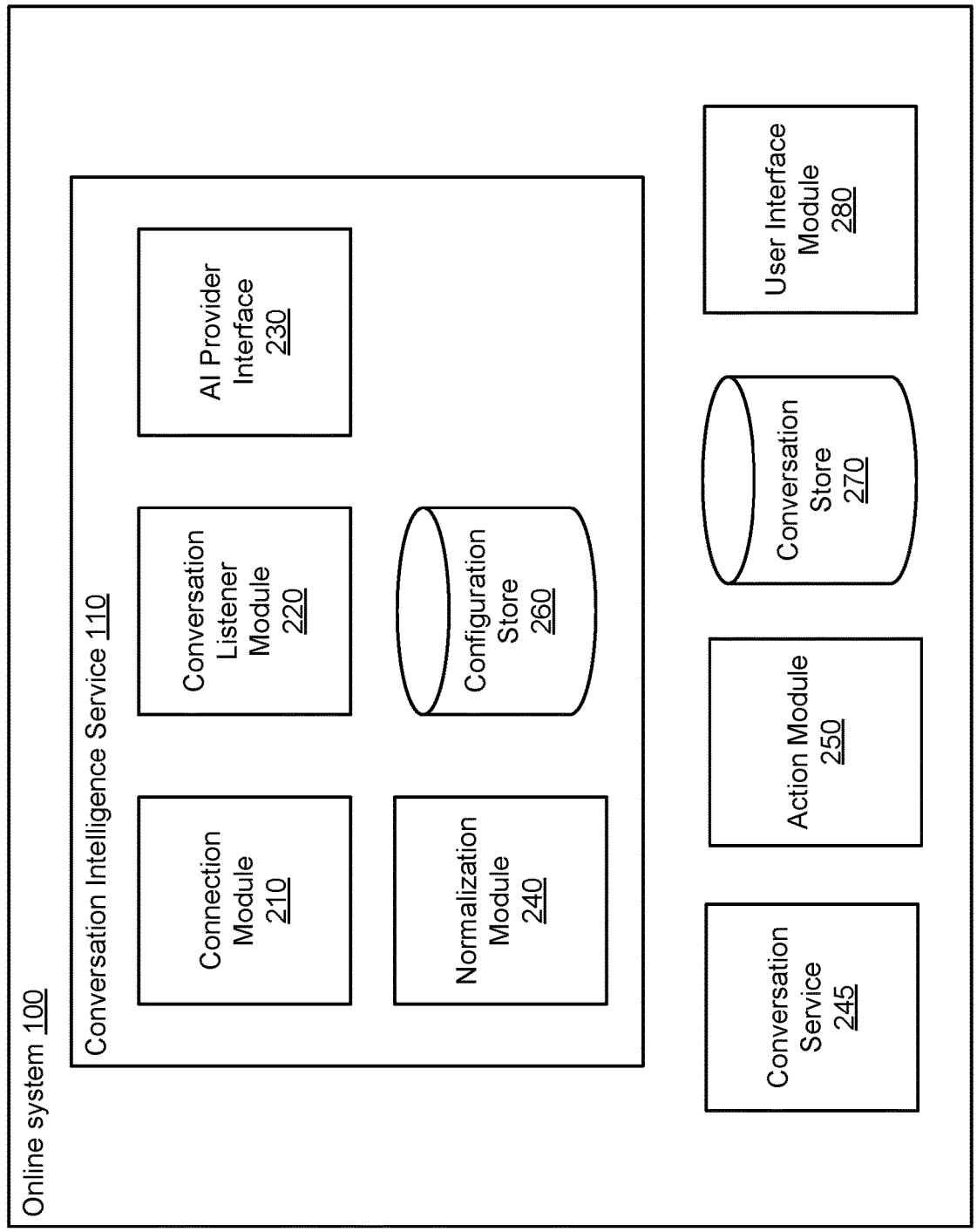
FIG. 2 is a block diagram of a system architecture of an online system comprising a conversation intelligence service, according to an embodiment.

FIG. 2 is a block diagram of a system architecture of an online system comprising a conversation intelligence service, according to an embodiment. The online system comprises a conversation intelligence service 110, an action module 250, a conversation store 270, and a user interface module 280. Other embodiments of online system 100 may have different and/or other components than the ones described here. Furthermore, the functionalities described herein can be distributed among the components in a different manner.

The conversation intelligence service 110 allows conversation channels to interact with AI provider systems to perform analysis of conversations. The conversation intelligence service 110 comprises a connection module 210, a conversation listener module 220, an AI provider interface 230, a normalization module 240, and a configuration store 260. Other embodiments of conversation intelligence service 110 may have different and/or other components than the ones described here. Furthermore, the functionalities described herein can be distributed among the components in a different manner.

The connection module 210, establishes connections with conversation channels 120 and AI provider systems 130. In an embodiment, an application running on the online system 100 specifies the conversation channel to use and the AI provider system to use. Accordingly, the connection module 210 selects the conversation channel from the plurality of conversation channels available for access to the online system and establishes a connection with the conversation channel. The connection module 210 also selects one or more AI provider systems selected from the plurality of AI provider systems available for access to the online systems and establishes connections with each AI provider system selected. Once a connection is established, the conversation intelligence service 110 uses the connection to interact with the conversation channel 120 or the AI provider system.

The conversation listener module 220 allows the conversation intelligence service 110 to receive information describing the conversations of a conversation channel 120. For example, the conversation listener module 220 may receive a real-time stream of utterances as they occur in a conversation. The conversation listener module 220 may receive transcription of utterances in a conversation from a conversation channel 120. The conversation listener module 220 may store the received information in the conversation store 270.

The AI provider interface 230 interacts with an AI provider system 130. In an embodiment, the AI provider interface 230 invokes APIs (application programming interfaces) of an AI provider system 130 to execute functionality provided by the AI provider system 130. In an embodiment, the conversation intelligence service 110 implements a unified conversation schema that defines the syntax used for representing conversations as well as results of AI analysis. The result of AI analysis is also referred to herein as conversation signal or conversation attributes. For example, the conversation signal or the conversation attribute may be an intent of an utterance, a sentiment of the conversation or an utterance, or an entity recognized in an utterance. The APIs of each AI provider system conform to the unified conversation schema. Accordingly, the APIs receive input that conforms to the unified conversation schema and return results that conform to the unified conversation schema. The conversation intelligence service 110 may use multiple AP provider systems to analyze the same conversation, for example, by obtaining a result R1 from an AI provider system A1 and a result R2 from an AI provider system A2.

The normalization module 240 receives conversations from the conversation channels and transforms them to a normalized conversation format that conforms to the unified conversation schema. Accordingly, the normalization module 240 preprocesses conversations so that they are ready for processing by the AI provider systems and also processes the results of the AI analysis so that the results are available in a standard format. Various AI provider systems may use different formats for representing their results of analysis. The normalization module 240 transforms the results of different AI provider systems so that the normalized results conforms to a unified conversation schema and can be processed by various tools. This simplifies the development of tools that can process the results of different types of AI analysis that is performed by a wide variety of AI provider systems as well as AI provider systems that may be developed in the future. Without normalization, a tool has to interpret the results of each AI provider system and process it. Furthermore, if an AI provider system modifies the result format or the format in which the information describing the conversation is received as input by the APIs, the tools break and need to be modified to use the new formats. The normalization of the conversation data as well as the AI analysis results protects the tools that use the information from changes to the AI provider system and also makes it easier for the tools to interface with various AI provider systems by providing a unified format conforming to a unified conversation schema.

Following is an example of a portion of a unified conversation schema.

```
{
  messageID: "mID1"
  startTime: timestamp1
  endTime: timestamp2
  content: "i would like to discuss ..."
  senderType: "end_user"
  participantID: "pID1"
  ciSignals: [
    {
      type: "intent"
      value: "credit card issue"
      confidence: 0.8
      timeStartOffset: timestampStart1
      timeEndOffset: timestampEnd1
    }
    {
      type: "entity"
      value: "person"
      confidence: 0.6
      timeStartOffset: timestampStart2
      timeEndOffset: timestampEnd2
    }
    {
      type: "sentiment"
      value: "negative"
      confidence: 0.9
      timeStartOffset: timestampStart3
      timeEndOffset: timestampEnd3
    }
    ...
  ]
}
```

The example unified conversation schema specifies attributes including a messageID to identify an utterance in a conversation, a startTime attribute to represent the start time of the utterance, an endTime attribute to represent the end time of the utterance, the content of the utterance (e.g., a transcribed version of an audio signal), a senderType attribute describing the type of the sender of the utterance (e.g., end user or an agent), and a participantID for identifying the participant. The unified conversation schema includes an attribute ci Signals that stores a set of conversation intelligence signals that represent AI analysis results provided by one or more AI provider systems. As shown in the above example unified conversation schema, a conversation intelligence signal may have a type attribute identifying the type of AI analysis result, a value attribute representing the value of the result, a confidence attribute representing a confidence value in the result as determined by the AI provider system, and start and end time offsets of the portion of the utterance associated with the specific analysis (e.g., a portion of an utterance that represents a particular issue or a portion of an utterance indicative of a particular sentiment).

The configuration store 260 stores configuration parameters describing how conversations are analyzed. A set of configuration parameters may also be referred to as a conversation analysis configuration. A set of configuration parameters may be for a specific tenant of a multi-tenant system. A set of configuration parameters may be for a specific application that processes conversation. In an embodiment, each application may store a set of configuration parameters for each tenant of a multi-tenant system. A set of configurations may be specific to a conversation channel.

A conversation analysis configuration may specify a parameter indicating whether utterances being analyzed are selected from a single participant of a conversation or from both participants. Accordingly, based on the parameter value, the conversation intelligence service 110 select utterances from the single participant for sending to the AI provider system or from two or more participants of the conversation. For example, the conversation may be between a user and an agent and the configuration parameter specifies that the AI analysis should only be performed using utterances from the user. Accordingly, the conversation intelligence service 110 select utterances from the user for sending to the AI provider system for analysis. If the configuration parameter specifies that the AI analysis should be performed using utterances from the user as well as the agent, the conversation intelligence service 110 selects utterances from the user as well as the agent for sending to the AI provider system for analysis.

In an embodiment, the conversation analysis configuration specifies a parameter representing a size of a group of utterance being analyzed. The conversation intelligence service 110 assimilates groups of utterances of the specified size from the conversation and sends representations of each utterance from the group and sends the group of normalized utterances to the artificial intelligence provider system.

In an embodiment, the results returned by an AI provider system include a confidence value representing a degree of confidence that the result is accurate. The conversation analysis configuration may specify a parameter that represents a threshold on the confidence value indicated in the result obtained from the artificial intelligence provider system. Accordingly, the conversation intelligence service 110 performs an action based on a result obtained from an AI provider system if the received confidence value in an API invocation exceeds the threshold specified in the conversation analysis configuration parameter.

The action module 250 uses the result of AI analysis to perform an action associated with the conversation. An action may be performed based on an AI analysis result obtained from a particular AI provider system or from a set of AI analysis results obtained from a plurality of AI provider systems. For example, the conversation intelligence service 110 may obtain a result R1 from an AI provider system A1 and a result R2 from an AI provider system A2 and perform an action based on a combination of results R1 and R2. An example, of an action is the next best action to be performed by an agent participating in a conversation. An action may represent determining a workflow to be performed in a given context within a conversation and recommending the workflow or recommending an action based on the workflow to an agent participating in the conversation. In an embodiment, the action module 250 includes a rule based system that triggers various actions based on result of AI analysis. For example, a rule may specify that if the intent has a specific value, certain workflow is triggered. A rule may specify that if the sentiment has a specific value, specific types of responses are generated.

In an embodiment, the result of an API invocation includes an intent based on an utterance and the action module 250 determines the action to be performed based on the intent. For example, if the intent represents that the user is interested in receiving a specific information, the action module 250 may access a database or a web service to retrieve the requested information. Alternatively, the action module 250 may select a specific workflow based on the intent. For example, if the intent indicates that the user is interested in certain type of information, the action module 250 may select a workflow that asks the user for additional information needed for determining the requested information. For example, if the intent indicates that the user is requesting a price of some item, the action module 250 may select a workflow that asks the user for additional information describing the item, so the online system can access the price of the exact item that the user is interested in.

In an embodiment, the result received from the AI provider system represents information describing an entity mentioned ion the utterance being analyzed, for example, an entity type of an entity mentioned in the conversation. The action module 250 may determine the type of database or data store to access information describing the entity. In an embodiment, the result received from the AI provider system represents a sentiment of the conversation or the sentiment of an utterance in the conversation and the action module 250 determines the next action to be performed by an agent for a given sentiment or the action module 250 may recommend a type of response to be given to a user by an agent. For example, if the sentiment indicates that a user is not happy with a product, the action module 250 may recommend a different response compared to a situation in which the sentiment indicates that the user is happy with the product.

The conversation store 270 stores information describing conversations. These may include information describing utterances of the conversation as well as metadata describing conversations that represents results of AI analysis performed by AI provider systems. The information describing conversations stored in the conversation store 270 may be used by applications or modules that process conversations, for example, the action module 250.

The conversation service 245 stores the utterances of the conversation as well as results of the AI analysis of the conversation in the conversation store 270. The conversation service 245 may also presents details of the conversation as well as the result of the AI analysis of the conversation via a user interface to a user, for example, an agent. For example, if the conversation is a speech conversation, the conversation service 245 logs the transcription of the conversation in the conversation store 270 and may display a text version of the conversation via a user interface to an agent.

The user interface module allows a user to interact with the online system 100 in connection with the conversation. For example, the user interface may present an agent with recommendations of the next best action to take in a given context during a conversation. The user interface may also present the conversation that has taken place for far in a session or a subset of the recent utterances of the conversation to the agent. Examples of screenshots of a user interface are presented in FIG. 5A-D.

Figure 3:
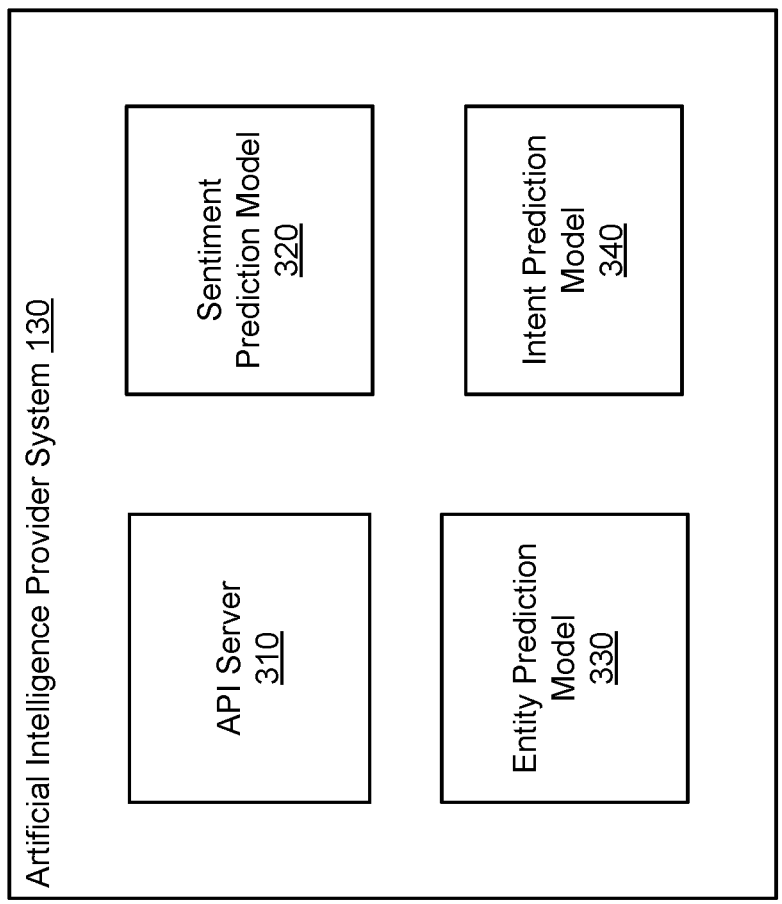
FIG. 3 is a block diagram of a system architecture of an artificial intelligence service provider, according to an embodiment.

FIG. 3 is a block diagram of a system architecture of an artificial intelligence provider system, according to an embodiment. The artificial intelligence provider system includes an API server 310 and a set of machine learning based models, for example, a sentiment prediction model 320, an entity prediction model 330, an intent prediction model 340, and so on. The API server 310 receives API requests, for example, API requests received from the conversation intelligence service 110. The API server 310 executes an machine learning based model in response to a request. The sentiment prediction model 320 determines a sentiment in an utterance of a conversation. The sentiment may be represented using an enumerated list of values or as predefined string or constant values, each value representing a type of sentiment. The entity prediction model 330 determines information describing entities in a conversation, for example, keywords that represent entities in an utterance and their entity types. For example, an entity may represent a name of a user, a date, an address, and so on. The intent prediction model 340 determines an intent of an utterance. The intent may be selected from a set of predefined intents, for example, requesting a specific type of information, providing a specific type of information, performing a specific action, and so on. The format used for representing the sentiment, intent, or entity information conforms to the unified conversation schema.

Processes

Figure 4:
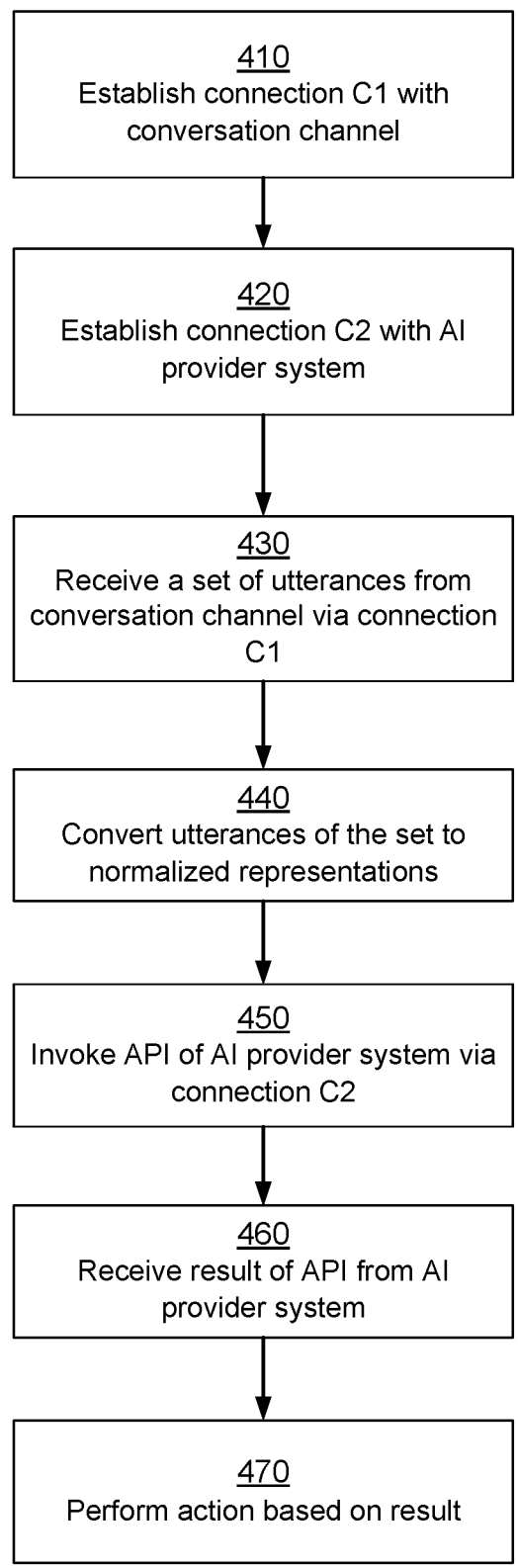
FIG. 4 is a flow chart illustrating the overall process of interfacing between a conversation channel and an artificial intelligence service provider, according to an embodiment.

FIG. 4 is a flow chart illustrating the overall process 400 of interfacing between a conversation channel and an artificial intelligence service provider, according to an embodiment. Other embodiments can perform the steps of these flowcharts in different orders. Furthermore, various embodiments can include different and/or additional steps than the ones described herein.

The conversation intelligence service 110 of the online system establishes 410 a first connection C1 with a conversation channel CH1 selected from the plurality of conversation channels that the online system can connect with. The conversation intelligence service 110 also establishes 420 a second connection C2 with an artificial intelligence provider system AIS1 selected from the plurality of artificial intelligence provider systems. In an embodiment, the artificial intelligence provider system is a module of the online system and the conversation intelligence service 110 establishes the connection with the module by setting up the data structures necessary to invoke functionality of the module.

The conversation intelligence service 110 receives 430 via the connection C1, a set of utterances that form part of a conversation being performed using the selected conversation channel CH1. The conversation intelligence service 110 converts 440 each utterance from the set of utterances to a normalized representation of the utterance. The conversation intelligence service 110 invokes 450 an API of the AI provider system AISs1 by sending, via the connection C2, a request to the AI provider system AIS1. The request provides the normalized representations of one or more utterances from the set of utterances to the AI provider system AIS1.

The AI provider system AIS1 applies a machine learning based model to the normalized representation of utterance to determine an AI analysis result, for example, an intent based on the utterance, a sentiment of the utterance, an entity recognized from the utterance, and so on. The conversation intelligence service 110 receives 460 as the result of the invocation of the API, the AI analysis result determined by the AI provider system AIS1. The conversation intelligence service 110 performs 470 an action based on the result of the API request received from the AI provider system. The conversation intelligence service 110 sends information to a user performing the conversation based on the action performed.

The conversation intelligence service 110 may analyze utterances provided by an agent or by a user during a conversation using the AI provider system to determine further actions to take, for example, detect an entity in the utterance and access database records to retrieve additional information associated with the entity identified by the user. This process continues as the conversation proceeds and the conversation intelligence service 110 continues to receive user utterances and perform AI analysis of the utterances to perform certain actions. The online system 100 may configure a user interface based on the AI analysis of the utterance, for example, by displaying specific information, displaying one or more widgets on the user interface selected based on the analysis, and by configuring the widgets based on the analysis. For example, the online system 100 may select a list of data items based on the AI analysis and display a widget representing a drop-down list that is configured to display the selected list of data items.

Figure 5A:
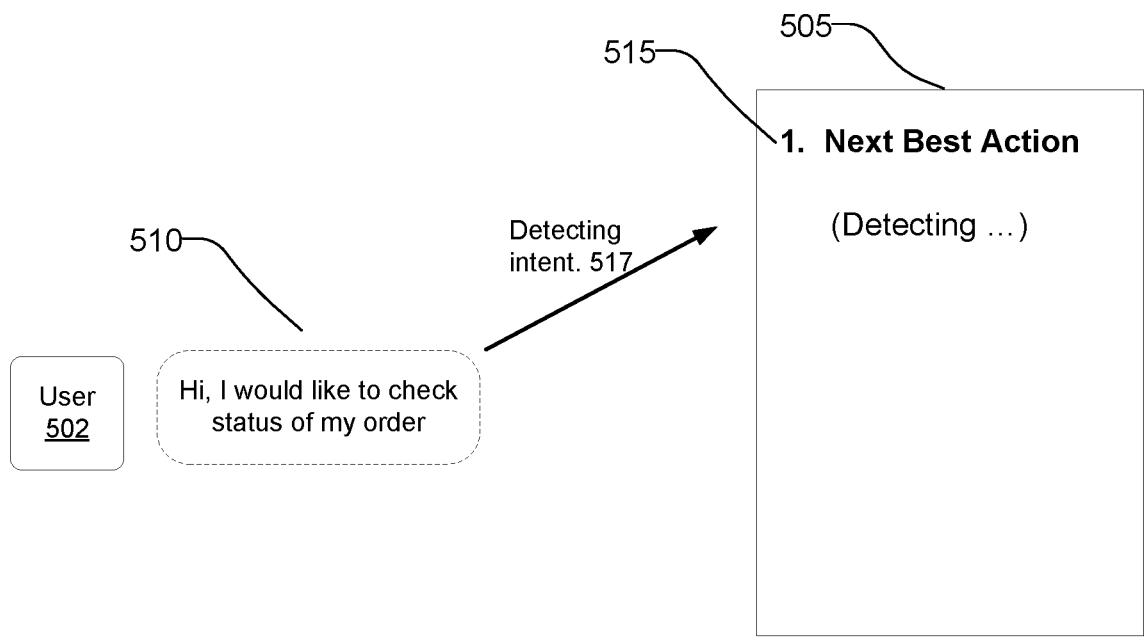
FIG. 5A-D shows screenshots of a user interface for assisting an agent using the conversation intelligence service, according to an embodiment.

FIG. 5A-D shows screenshots of a user interface for assisting an agent using the conversation intelligence service, according to an embodiment. As shown in FIG. 5A, a user 502 calls an enterprise and talks to an agent that acts as a representative of the enterprise. The user states the reason for the call via an utterance 510. The conversation intelligence service 110 receives the utterance, normalizes the utterance and invokes an API of an AI provider system to detect 517 an intent of the utterance.

Figure 5B:
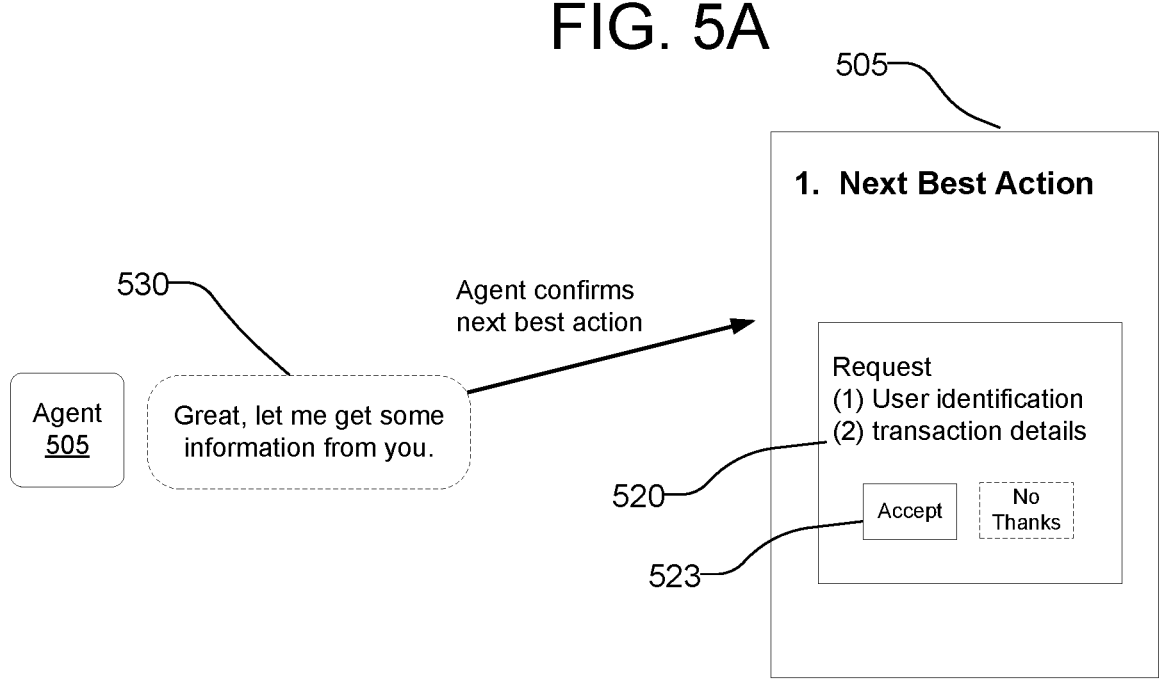

As shown in FIG. 5B, the user interface 505, the online system 100 initiates a workflow 520 based on the intent and shows the initiated workflow 515 to the agent. The agent confirms the workflow 520 to approve the workflow, for example, by clicking on the accept button 523.

Figure 5C:
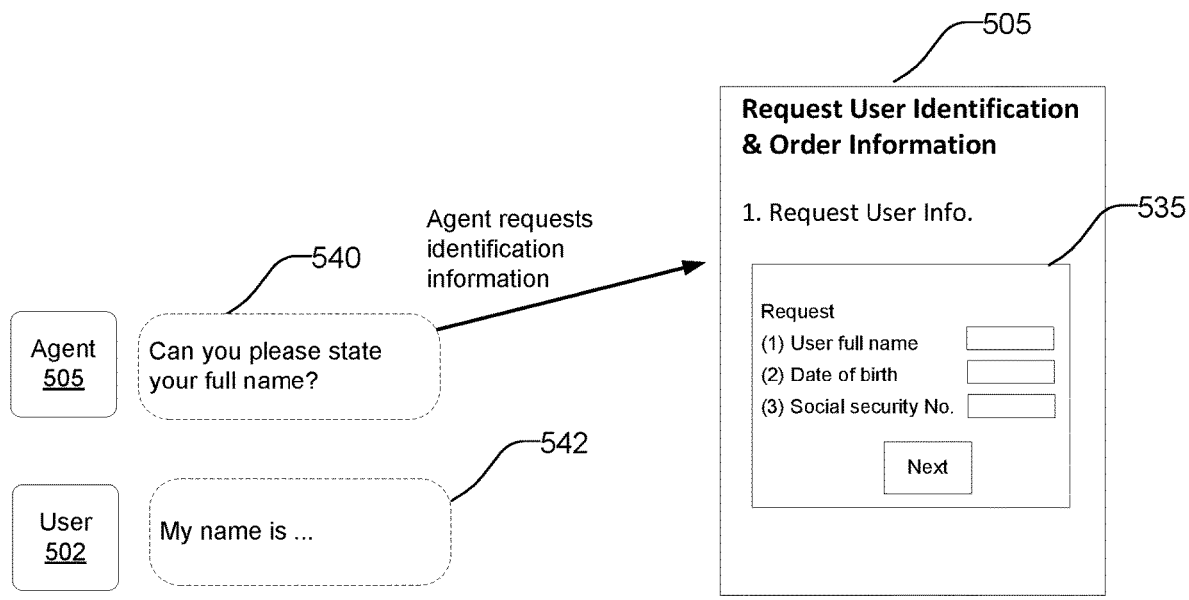

As shown in FIG. 5C, the workflow recommends the next best action 535 to the agent, suggesting that the agent to ask the user for additional information. The agent 505 asks 540 the user for additional information. The online system configures the user interface 505 to display one or more widgets, for example, a form 535 that allow the agent to provide necessary information for performing the next best action. The agent asks the user using an utterance 540 for the fields that need to be filled via the form 535. The user 502 provides the additional information requested via utterance 542 shown in FIG. 5C. FIG. 5C shows the agent asking user for the user information including name, date of birth, and social security number.

Figure 5D:
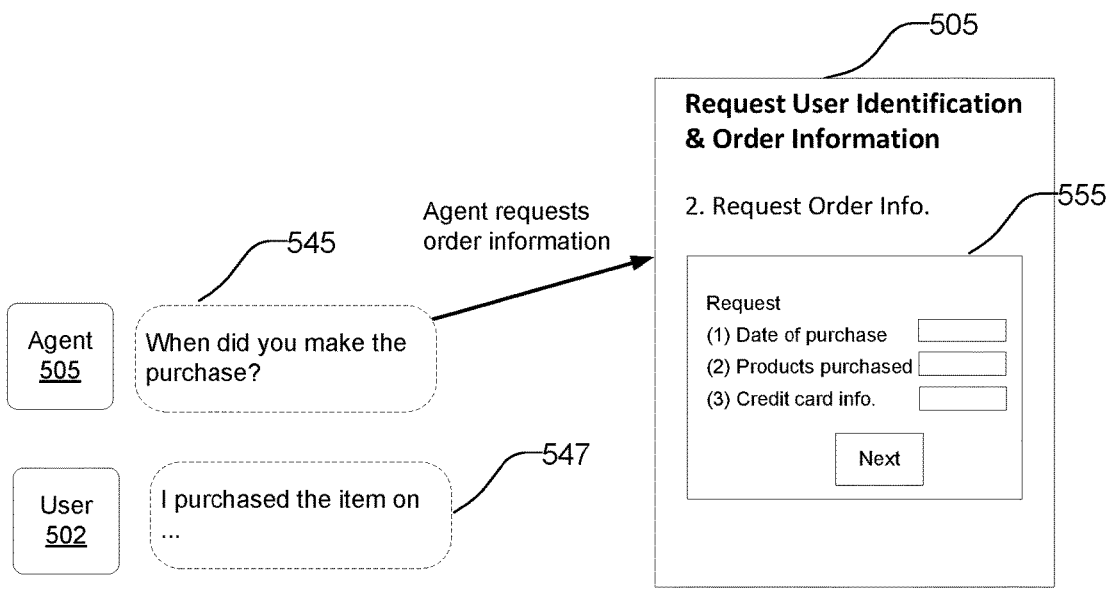

As shown in FIG. 5D, the online system configures another user interface shows widgets, for example, form 555 that allows the agent to provide the order information to the online system including the date of purchase, products purchased, credit card information, and so on. The agent 505 asks the user for information describing the order via utterance 545 and the user 502 provides the requested information via utterance 547.

Computer Architecture

Figure 6:
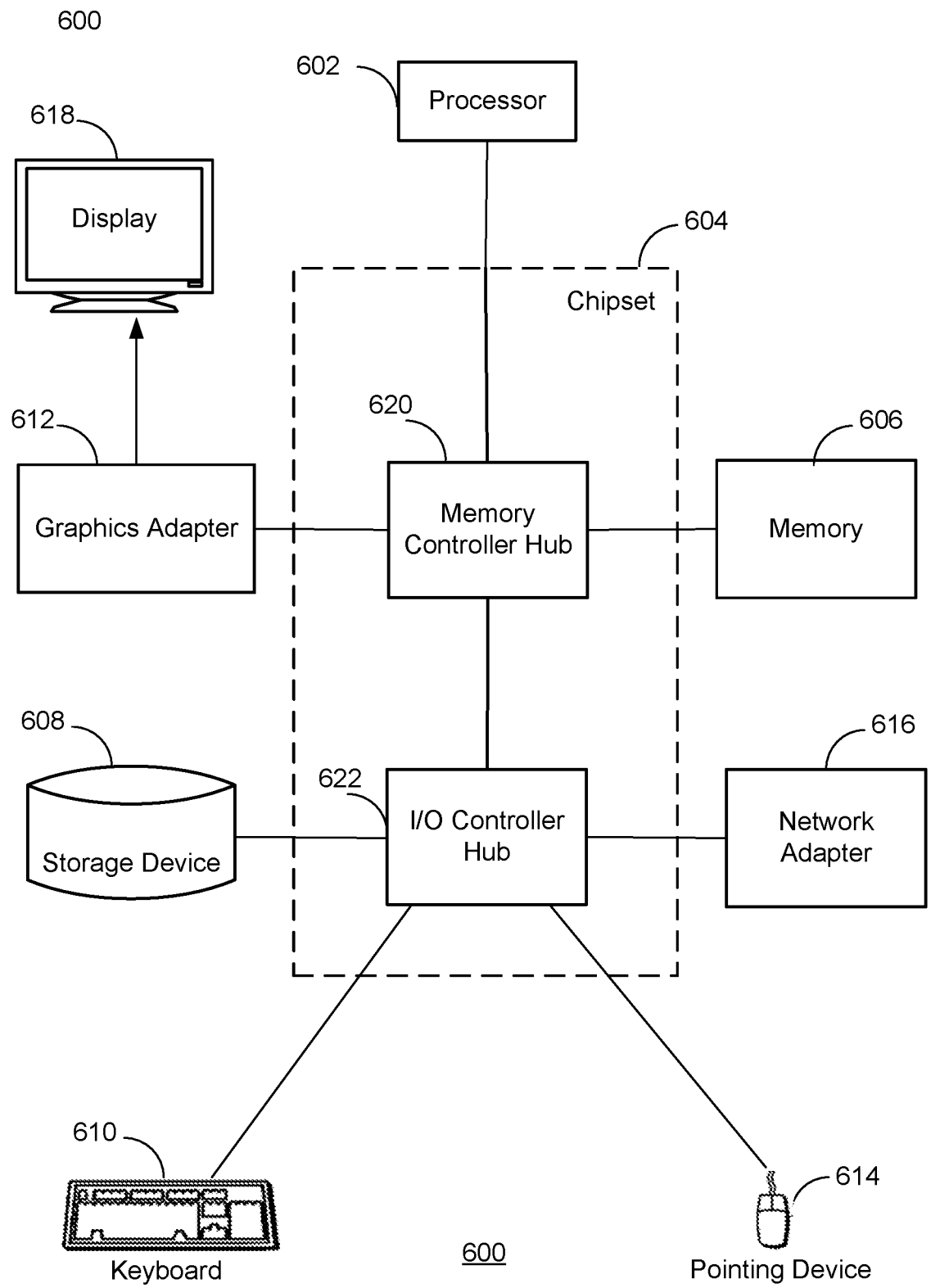
FIG. 6 is a block diagram illustrating a functional view of a typical computer system according to one embodiment.

FIG. 6 is a high-level block diagram illustrating a functional view of a typical computer system for use as one of the entities illustrated in the environment of FIG. 1 according to an embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to a network.

As is known in the art, a computer 600 can have different and/or other components than those shown in FIG. 6. In addition, the computer 600 can lack certain illustrated components. For example, a computer system 600 acting as an online system 100 may lack a keyboard 610 and a pointing device 614. Moreover, the storage device 608 can be local and/or remote from the computer 600 (such as embodied within a storage area network (SAN)).

The computer 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the entities of FIG. 1 can vary depending upon the embodiment and the processing power used by the entity. For example, a client device may be a mobile phone with limited processing power, a small display 618, and may lack a pointing device 614. The online system 100, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies.

Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A computer implemented method for interfacing conversation channels with artificial intelligence provider systems, the method comprising:
    establishing, by an online system, a first connection with a conversation channel selected from a plurality of conversation channels;
    establishing, by the online system, a second connection with an artificial intelligence provider system selected from a plurality of artificial intelligence provider systems;
    receiving via the first connection, one or more utterances from a conversation performed using the selected conversation channel;
    converting the one or more utterances to normalized representations of utterances;
    sending, via the second connection, a request to the selected artificial intelligence provider system, the request providing at least a first normalized representation of a first utterance;
    receiving, from the artificial intelligence provider system, a result determined by the artificial intelligence provider system by applying a machine learning based model to the first normalized representation of the first utterance;
    performing an action based on the result of the request received from the artificial intelligence provider system; and
    sending information to the selected conversation channel based on the action performed.

2. The computer implemented method of claim 1, wherein the result determined by the artificial intelligence provider system represents one of:
    an intent of the first utterance;
    a sentiment of the first utterance; or
    information describing an entity mentioned in the first utterance.

3. The computer implemented method of claim 1, wherein the artificial intelligence provider system is a first artificial intelligence provider system, the utterance is a first utterance, the result is a first result, the machine learning based model is a first machine learning based model, the method further comprising:
    establishing, by the online system, a third connection with a second artificial intelligence provider system selected from the plurality of artificial intelligence provider systems;
    sending, via the second connection, a request to the artificial intelligence provider system, the request providing at least a normalized representation of a second utterance; and
    receiving, from the second artificial intelligence provider system, a second result determined by the second artificial intelligence provider system by applying a second machine learning based model to the normalized representation of the second utterance.

4. The computer implemented method of claim 3, wherein the action is performed based on the first result obtained from the first artificial intelligence provider system and the second result obtained from the second artificial intelligence provider system.

5. The computer implemented method of claim 1, wherein the action represents a next best action to be performed by an agent participating in the conversation.

6. The computer implemented method of claim 1, further comprising:
    receiving a conversation analysis configuration associated with the selected conversation channel, wherein the request send to the artificial intelligence system is according to the conversation analysis configuration.

7. The computer implemented method of claim 6, wherein the conversation analysis configuration comprises a parameter specifying that utterances analyzed are selected from a single participant of a conversation, the method further comprising:
    selecting a second utterance from the single participant for sending to the artificial intelligence provider system.

8. The computer implemented method of claim 6, wherein the conversation analysis configuration comprises a parameter specifying that utterances analyzed are selected from a both participants of the conversation, the method further comprising:
    selecting a second utterance from any one of two participants for sending to the artificial intelligence provider system.

9. The computer implemented method of claim 6, wherein the conversation analysis configuration specifies a size of a group of utterance analyzed, the method further comprising:
    selecting set of related utterances based on the specified size; and
    sending normalized representations of the set of related utterances to the artificial intelligence provider system.

10. The computer implemented method of claim 6, wherein the conversation analysis configuration comprises a parameter that specifies a threshold on a confidence value in the result obtained from the artificial intelligence provider system, the method further comprising:
    receiving, from the artificial intelligence provider system, a confidence value associated with the result, wherein the action is performed responsive to the received confidence value exceeding the threshold specified in the conversation analysis configuration.

11. The computer implemented method of claim 1, wherein the online system is a multi-tenant system, wherein a conversation channel is associated with a tenant of the multi-tenant system.

12. The computer implemented method of claim 1, wherein the online system is a multi-tenant system storing data for a plurality of tenants, the method further comprising:
    receiving a plurality of conversation analysis configurations, wherein a conversation analysis configuration is associated with a tenant from the plurality of tenants.

13. The computer implemented method of claim 1, wherein the normalized representation of the first utterance conforms to a unified conversation schema, wherein the selected artificial intelligence provider system is configured to process requests conforming to the unified conversation schema.

14. The computer implemented method of claim 1, wherein the result represents an intent in the utterance determined by the artificial intelligence provider system, wherein performing the action comprises selecting a workflow based on the intent.

15. The computer implemented method of claim 1, wherein the result represents an entity type of a keyword in the utterance, wherein performing the action comprises accessing one or more records of the entity type from a database.

16. The computer implemented method of claim 1, wherein the result represents a sentiment of the utterance, wherein performing the action comprises recommending one or more responses for providing to a participant.

17. A non-transitory computer readable storage medium storing instructions that when executed by a computer processor cause the computer processor to perform steps for interfacing communication channels with artificial intelligence provider systems, the steps comprising:
   establishing, by an online system, a first connection with a conversation channel selected from a plurality of conversation channels;
   establishing, by the online system, a second connection with an artificial intelligence provider system selected from a plurality of artificial intelligence provider systems;
   receiving via the first connection, one or more utterances from a conversation performed using the selected conversation channel;
   converting the one or more utterances to normalized representations of utterances;
   sending, via the second connection, a request to the selected artificial intelligence provider system, the request providing at least a normalized representation of a first utterance;
   receiving, from the selected artificial intelligence provider system, a result determined by the selected artificial intelligence provider system by applying a machine learning based model to the first normalized representation of the first utterance;
   performing an action based on the result of the request received from the selected artificial intelligence provider system; and
   sending information to the selected communication channel based on the action performed.

18. The non-transitory computer readable storage medium of claim 17, wherein the selected artificial intelligence provider system is a first artificial intelligence provider system, the utterance is a first utterance, the result is a first result, the machine learning based model is a first machine learning based model, wherein the instructions further cause the computer processor to perform steps comprising:
   establishing, by the online system, a third connection with a second artificial intelligence provider system selected from the plurality of artificial intelligence provider systems;
   sending, via the second connection, a request to the second artificial intelligence provider system, the request providing at least a second normalized representation of a second utterance; and
   receiving, from the second artificial intelligence provider system, a second result determined by the second artificial intelligence provider system by applying a second machine learning based model to the second normalized representation of the second utterance.

19. A computer system for interfacing communication channels with artificial intelligence provider systems, the computer system comprising:
   a computer processor; and
   a non-transitory computer readable storage medium storing instructions that when executed by a computer processor cause the computer processor to perform steps comprising:
      establishing, by an online system, a first connection with a conversation channel selected from a plurality of conversation channels;
      establishing, by the online system, a second connection with an artificial intelligence provider system selected from a plurality of artificial intelligence provider systems;
      receiving via the first connection, one or more utterances from a conversation performed using the selected conversation channel;
      converting the one or more utterances to normalized representations of utterances;
      sending, via the second connection, a request to the selected artificial intelligence provider system, the request providing at least a normalized representation of a first utterance;
      receiving, from the selected artificial intelligence provider system, a result determined by the selected artificial intelligence provider system by applying a machine learning based model to the first normalized representation of the first utterance;
      performing an action based on the result of the request received from the selected artificial intelligence provider system; and
      sending information to the selected communication channel based on the action performed.

20. The computer system of claim 19, wherein the selected artificial intelligence provider system is a first artificial intelligence provider system, the utterance is a first utterance, the result is a first result, the machine learning based model is a first machine learning based model, wherein the instructions further cause the computer processor to perform steps comprising:
   establishing, by the online system, a third connection with a second artificial intelligence provider system selected from the plurality of artificial intelligence provider systems;
   sending, via the second connection, a request to the second artificial intelligence provider system, the request providing at least a second normalized representation of a second utterance; and
   receiving, from the second artificial intelligence provider system, a second result determined by the second artificial intelligence provider system by applying a second machine learning based model to the second normalized representation of the second utterance.

* * * * *